(12) United States Patent
Buchet et al.

(10) Patent No.: US 8,880,211 B2
(45) Date of Patent: Nov. 4, 2014

(54) PROCESSING DEVICE FOR PROCESSING AN ORDER REQUEST OF AN OPHTHALMIC LENS

(75) Inventors: Jean-Francois Buchet, Charenton le Pont (FR); Herve Poittevin de la Fregonniere, Charenton le Pont (FR); Pierre Fourmestraux, Charenton le Pont (FR); Loic Morel, Charenton le Pont (FR)

(73) Assignee: Essilor International (Compagnie Generale d'Optique), Charenton le Pont Cedex (FR)

( * ) Notice: Subject to any disclaimer, the term of this patent is extended or adjusted under 35 U.S.C. 154(b) by 792 days.

(21) Appl. No.: 13/123,699

(22) PCT Filed: Oct. 6, 2009

(86) PCT No.: PCT/EP2009/062987
§ 371 (c)(1),
(2), (4) Date: Sep. 19, 2011

(87) PCT Pub. No.: WO2010/040757
PCT Pub. Date: Apr. 15, 2010

(65) Prior Publication Data
US 2011/0320029 A1    Dec. 29, 2011

(30) Foreign Application Priority Data

Oct. 10, 2008  (EP) ..................................... 08305670

(51) Int. Cl.
*G06F 19/00*   (2011.01)
*G06Q 10/08*   (2012.01)

(52) U.S. Cl.
CPC .................................. *G06Q 10/087* (2013.01)

USPC ............................................. 700/117; 700/97

(58) Field of Classification Search
USPC ......... 700/95, 96, 97, 98, 117, 118, 159, 182;
705/26.8, 26.81
See application file for complete search history.

(56) References Cited

U.S. PATENT DOCUMENTS

| 4,781,452 | A  | * | 11/1988 | Ace ............................ 351/159.74 |
| 5,774,551 | A  | * | 6/1998  | Wu et al. ......................... 713/155 |
| 5,808,894 | A  |   | 9/1998  | Wiens et al. |
| 6,839,748 | B1 | * | 1/2005  | Allavarpu et al. ............. 709/223 |
| 7,010,586 | B1 | * | 3/2006  | Allavarpu et al. ............. 709/223 |
| 7,062,454 | B1 | * | 6/2006  | Giannini et al. ............ 705/26.81 |

(Continued)

FOREIGN PATENT DOCUMENTS

| JP | 05-5120567 | 5/1993 |
| JP | 10-207778  | 8/1998 |

(Continued)

*Primary Examiner* — Charles Kasenge
(74) *Attorney, Agent, or Firm* — Cozen O'Connor

(57) ABSTRACT

A processing device (RX) for processing an order request of an ophthalmic lens, comprising: receiving means (REC) arranged for receiving an order request from a management entity (LMS), the management entity (LMS) being arranged to be linked to at least one lens manufacturing device (MAN), the order request comprising at least information related to an optical wearer's prescription, processing means (PROC) arranged for processing the order request on the basis of predetermined processing rules so as to obtain parameters of the ophthalmic lens according to the information comprised in the order request, sending means (SEN) arranged for sending the obtained parameters of the ophthalmic lens to the management entity (LMS), wherein the processing device (RX) is arranged to prevent an unauthorized access to the predetermined processing rules.

13 Claims, 5 Drawing Sheets

(56) References Cited

U.S. PATENT DOCUMENTS

| | | | |
|---|---|---|---|
| 7,069,107 B2 * | 6/2006 | Ueno | 700/182 |
| 7,159,982 B2 * | 1/2007 | Shinohara et al. | 351/159.74 |
| 7,167,771 B2 * | 1/2007 | Ito | 700/182 |
| 7,175,277 B2 * | 2/2007 | Shinohara et al. | 351/159.06 |
| 7,188,082 B2 * | 3/2007 | Keane et al. | 705/26.81 |
| 7,219,075 B2 * | 5/2007 | Kobayashi | 705/26.5 |
| 7,860,594 B2 * | 12/2010 | Andino et al. | 700/98 |
| 8,295,961 B2 * | 10/2012 | Daimaru et al. | 700/98 |
| 2004/0246440 A1 | 12/2004 | Andino | |
| 2005/0004694 A1 * | 1/2005 | Ueno | 700/97 |
| 2005/0157254 A1 * | 7/2005 | Shinohara et al. | 351/158 |
| 2008/0033836 A1 * | 2/2008 | Shinohara et al. | 705/26 |
| 2008/0052194 A1 * | 2/2008 | Shinohara et al. | 705/27 |
| 2011/0320029 A1 * | 12/2011 | Buchet et al. | 700/117 |

FOREIGN PATENT DOCUMENTS

| | | |
|---|---|---|
| JP | 2002-203131 | 7/2002 |
| JP | 2006-285438 | 10/2006 |
| WO | WO 99/40501 | 8/1999 |

\* cited by examiner

PROCESSING DEVICE FOR PROCESSING AN ORDER REQUEST OF AN OPHTHALMIC LENS

This is a U.S. National Phase Application under 35 USC 371 of International Application PCT/EP2009/062987 filed on Oct. 6, 2009.

This application claims the priority of European application no. 08305670.5 filed Oct. 10, 2008, the entire content of which is hereby incorporated by reference.

FIELD OF THE INVENTION

The invention relates to a method of processing an order request of an ophthalmic lens, a processing device and system for processing an order request of an ophthalmic lens.

BACKGROUND OF THE INVENTION

Usually, a person needing to wear spectacles and having thus a prescription filled by an ophthalmologist or by another authorized eye care professional goes to the premise of an optician for choosing the frame of the future spectacles and to order the ophthalmic lenses. The future wearer of the spectacles may try several spectacle frames and finally choose one of the tried frames. The optician sends an order to a lens provider so as to have the lenses provided to him.

The lens provider has different manufacturing technique available so as to manufacture a lens corresponding to the prescription of the wearer.

For example, lenses are commonly manufactured by using a limited number of semi-finished lens blanks. The front face of a semi-finished lens blank is usually intended to be the final front surface of the final lens and the other face is machined so as the optical system of the final lens fits the wearer ophthalmic prescriptions.

According to such manufacturing technique the lens provider determines the most appropriate semi-finished lens blank and the most appropriate design for the rear face of the lens so as to fit the wearer ophthalmic prescription.

Once the lens provider has determine the most appropriate semi-finished lens blank and design, the lens provider according to the type of manufacturing equipment generates manufacturing parameters that correspond to said semi-finished lens blank and said design.

The manufacturing parameters are then sent to the different manufacturing entities and the semi-finished lens blank is manufactured according to said manufacturing parameters.

The manufactured lens may be sent as such to the optician or if the optician has provided geometrical parameters of the spectacle frame chosen by the wearer, the lens provider may, for example, edge the manufactured lens and provide to the optician edged lenses.

The lens provider may have a plurality of manufacturing labs in different region or states and the optician's order may be forwarded to any of those lab, for example according to the work load of each lab or any other criteria. For example, each lab may be specialized in a type of lens design and therefore according to the type of lens the optician's order may be forwarded to a lab or another.

The lens provider may also need to contract out some of the lens orders for example to face overloads. The lens provider may also work with licensed labs that may work for different lens providers.

When a lens provider has different labs or works with external labs, the lens provider needs to either provide to each lab the manufacturing parameter or provide processing means arranged for processing the order request on the basis of predetermined processing rules so as to obtain manufacturing parameters of the ophthalmic lens according to the information comprised in the order request.

Most of the lens providers prefer to simply forward the optician's order request to the lab and have the lab determine the manufacturing parameters.

According to such configuration, the lens provider provides the different labs with processing means required to determine the most accurate manufacturing parameters according to the information comprised in the optician's order request.

The present invention aims at improving the present situation.

SUMMARY OF THE INVENTION

One aspect of the invention relates to a method of processing an order request of an ophthalmic lens comprising:
  an order request receiving step in which an order request comprising at least information related to an optical wearer's prescription is received by a management entity,
  an order request transfer step in which the order request is transferred from the management entity to a processing device,
  an order request processing step in which the order request is processed by processing means of the processing device on the basis of predetermined processing rules so as to obtain parameters of the ophthalmic lens according to the information comprised in the order request,
wherein the processing device is arranged to prevent an unauthorized access to the predetermined processing rules.

According to a configuration of the prior art the lens provider forwards the optician's order request to the lab and the lab determine the manufacturing parameters. Furthermore, usually when the lens provider improves or updates the predetermined processing rules he provides to the lab a reliable medium such as a CD-Rom comprising the updates of the predetermined processing rules.

Thus, any person in the lab may have access to the predetermined processing rules part of the know-how of the lens provider.

Advantageously, according to the method of the invention, the processing device is arranged to prevent an unauthorized access to the predetermined processing rules.

Therefore the know-how of the lens provider may not be accessed by an unauthorized third party.

According to an embodiment of the invention, the parameters of the ophthalmic lens comprise manufacturing parameters, and the method further comprises:
  a parameters transfer step in which the manufacturing parameters of the ophthalmic lens are transferred from the processing device to at least one lens manufacturing device,
  a manufacturing step in which the ophthalmic lens is manufactured by the lens manufacturing device according to the manufacturing parameters.

Another aspect of the invention relates to a processing device for processing an order request of an ophthalmic lens, comprising:
  receiving means arranged for receiving an order request from a management entity, the management entity being arranged to be linked to at least one lens manufacturing device, the order request comprising at least information related to an optical wearer's prescription, processing means arranged for processing the order request on the basis of predetermined processing rules so as to obtain parameters of the ophthalmic lens according to the information comprised in the order request, sending means arranged for sending the obtained parameters of the ophthalmic lens to the management entity, wherein the processing device is arranged to prevent an unauthorized access to the predetermined processing rules.

According to further embodiments which can be considered alone or in combination:

the predetermined processing rules comprise calculating rules adapted to calculate parameters of the ophthalmic lens from part of the information comprised in the order request, the predetermined processing rules comprise rules for selecting in a data base the most appropriate design for the ophthalmic lens, the processing means are arranged in at least one secured housing, the processing means comprise a memory storing instructions for implementing at least part of the predetermined processing rules, and wherein the processing device further comprises detection means arranged for detecting an unauthorized attempt to access to the memory and/or for, upon detection of an unauthorized attempt to access to the memory, destroy the content of the memory, the processing device further comprises an interface arranged for receiving pluggable authorization means adapted to authorize access to the predetermined processing rules, and the processing device comprises update means arranged to be linked via a secured connection to a distant entity and for sending an updated request to the distant entity so as to update the predetermined processing rules.

Another aspect of the invention relates to a processing system for processing an order request of an ophthalmic lens, comprising:

a management entity arranged for receiving an order request, and for being linked to at least one lens manufacturing device, at least one processing device according to an embodiment of the invention linked to the management entity, wherein the management entity is linked to the processing device.

Advantageously, the lens provider that uses a processing system according to an embodiment of the invention can prevent any access to the processing means, and in particular to the predetermined processing rules, which comprise the lens provider know-how.

According to further embodiments which can be considered alone or in combination:

the processing system comprises a plurality of processing devices, the processing means of each processing devices being arranged in distinct secured housings, the processing system comprises a plurality of processing devices, each processing device comprises a memory storing instructions for implementing at least part of the predetermined processing rules, and wherein each processing device further comprises distinct detection means arranged for detecting an unauthorized attempt to access to the memory of the processing device and/or for, upon detection of an unauthorized attempt to access to the memory, destroy the content of the memory, the processing system further comprises at least one lens manufacturing device linked to the management entity, the management entity is linked to the processing device via a secured connection.

Another aspect of the invention relates to a server arranged for communicating via a secured connection with at least one processing device according to an embodiment of the invention, the server comprising management update means arranged for upon reception of an update request from the processing device, checking the current version of the predetermined processing rules of the processing device and sending update version of the predetermined processing rules to the processing device.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer or Very high speed integrated circuit Hardware Description Language ("VHDL"), or Complex Instruction Set Computer ("CISC") architecture, for example X 86, or Reduced Instruction Set Computer ("RISC") architecture, for example ARM.

Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In the sense of the invention, "a secured connection" is a connected that may be secured via hardware security means and/or via software security means, for example using encrypted secured connection, for example using an RSA algorithm or any other well known encryption algorithm.

In the sense of the invention, "parameters of the ophthalmic lens" shall mean optical parameters and/or manufacturing parameters and/or physical parameters and/or the design and/or any other well known parameters of the ophthalmic lens, in particular "the manufacturing parameters" may comprise the settings parameters of the different manufacturing devices involved in a manufacturing process of an ophthalmic lens.

BRIEF DESCRIPTION OF THE DRAWINGS

Non limiting embodiments of the invention will now be described with reference to the following drawings, wherein.

DETAILED DESCRIPTION OF EMBODIMENTS OF THE INVENTION

Figure 1A:
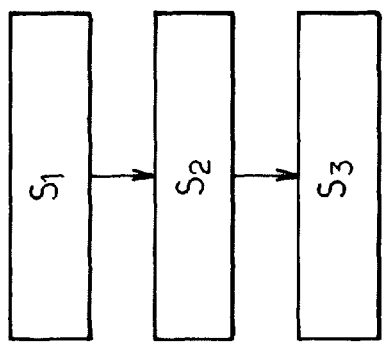
FIGS. 1a and 1b are flowcharts of the steps comprised in two methods of processing an order request according to two embodiments of the invention.

As illustrated on FIG. 1a, the invention relates to a method of processing an order request of an ophthalmic lens comprising:

an order request receiving step S1 in which an order request comprising at least information related to an optical wearer's prescription is received by a management entity LMS, an order request transfer step S2 in which the order request is transferred from the management entity LMS to a processing device RX, an order request processing step S3 in which the order request is processed by processing means PROC of the processing device RX on the basis of predetermined processing rules so as to obtain parameters of the ophthalmic lens according to the information comprised in the order request.

According to the invention the processing device RX is arranged to prevent an access, for example an unauthorized access, to the predetermined processing rules.

According to an embodiment of the invention the management entity LMS is linked to the processing device RX via a secured connection, for example a Local area Network LAN secured connection.

According to an embodiment of the invention the order request may comprise information related to the choice of spectacle frame from the wearer, the choice of a front face curvatures of the ophthalmic lens by the wearer or the optician, or any customising parameters selected either by the wearer or the optician.

According to an embodiment of the invention, the parameters of the ophthalmic lens may comprise optical parameters and/or manufacturing parameters and/or finishing parameters.

The finishing parameters can be, for example, the edging parameters and/or the drilling parameters and/or the centering parameters of the ophthalmic lens.

The optical parameters can be, for example, the optical index, the ophthalmic lens thickness, the base curve of the ophthalmic lens, the weigh, the ophthalmic lens material, and more generally any other well known parameters that are suitable for definition an ophthalmic lens.

Figure 1B:
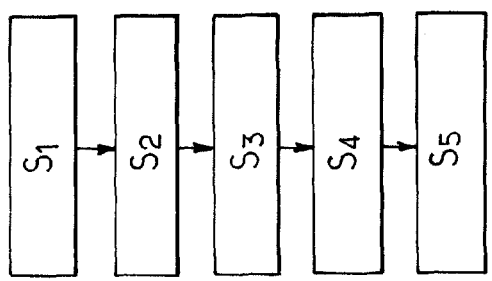

As illustrated on FIG. 1b, according to an embodiment of the invention the method of processing an order request of an ophthalmic lens may comprise:

an order request receiving step S1 in which an order request comprising at least information related to an optical wearer's prescription is received by a management entity LMS, an order request transfer step S2 in which the order request is transferred from the management entity LMS to a processing device RX, an order request processing step S3 in which the order request is processed by processing means PROC of the processing device RX on the basis of predetermined processing rules so as to obtain parameters of the ophthalmic lens according to the information comprised in the order request, a parameters transfer step S4 in which the manufacturing parameters of the ophthalmic lens are transferred from the processing device RX to at least one lens manufacturing device MAN, for example, via the management entity LMS, and a manufacturing step S5 in which the ophthalmic lens is manufactured by the lens manufacturing device MAN according to the manufacturing parameters.

The order request receiving step S1, the order request transfer step S2, and the order request processing step S3 may comprise all the features of the method according to the previously describe embodiment of the invention.

During the parameters transfer step S4, the manufacturing parameters can be transferred from the processing device RX to the lens manufacturing device MAN, either directly or indirectly, for example, via the management entity LMS.

Advantageously, according to an embodiment of the invention in which the manufacturing parameters are transferred directly, the manufacturing parameters may comprise an authorization information limiting the number of time the lens manufacturing device MAN is authorized to use the obtained manufacturing parameters.

More advantageously, if the manufacturing parameters are transferred directly, the manufacturing parameters may not be access by the management entity LMS which allows a better control of the use of the manufacturing parameters.

For example, such a solution reduces the risk that a lab manufactures more than the authorized number of ophthalmic lens.

The manufacturing step S5 may be carried out using well-known manufacturing devices or manufacturing tools such as generator and/or polisher.

According to an embodiment of the invention the method may be carried out by a lens manufacturing system comprising a processing system and a manufacturing device. The processing system comprise a processing device according to the invention as illustrated on FIG. 2a.

Figure 2A:
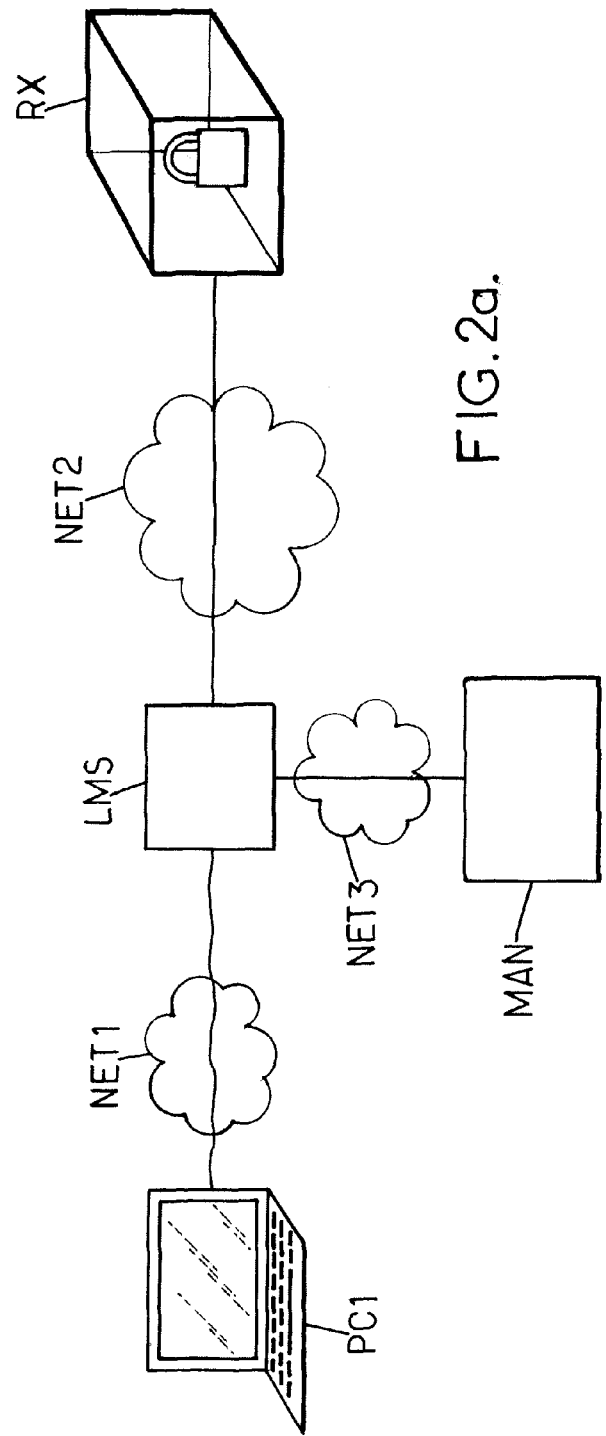
FIG. 2a is a schematic drawing illustrating a processing system for processing an order request of an ophthalmic lens according to an embodiment of the invention.

The lens manufacturing system illustrated on FIG. 2a comprises:

a management entity LMS arranged for receiving an order request, and linked to a lens manufacturing device MAN, a processing device RX comprising:

receiving means REC arranged for receiving the order request from the management entity LMS, the order request comprising at least information related to an optical wearer's prescription, processing means PROC arranged for processing the order request on the basis of predetermined processing rules so as to obtain parameters of the ophthalmic lens according to the information comprised in the order request, sending means arranged for sending the obtained parameters of the ophthalmic lens to the management entity LMS, the processing device RX is arranged to prevent an unauthorized access to the predetermined processing rules.

The management entity LMS is linked to the processing device RX via a network connection NET2, for example a LAN connection, for example a secured network connection.

According to an embodiment of the invention, the management entity LMS of the processing system is linked to at least one lens manufacturing device MAN via a network connection NET3, for example a LAN connection and to a distant computer entity PC1 via a network NET1, for example the internet.

According to an embodiment of the invention, the processing system and the lens manufacturing device are in the lens provider's lab side. Therefore, during the processing of the order request, the specificities of the lens manufacturing devices MAN may be considered when obtaining the manufacturing parameters of the ophthalmic lens. Thus, advantageously, the manufacturing parameters are customized according to the specificities of the lens manufacturing devices.

The distant computer entity PC1 may be for example at the optician side and may be used by the optician to enter an order request. The order request may comprise information related to the prescription of the wearer, and any customizing information such as for example the shape and/or the type of the chosen spectacle frame and/or the choice of specific curvatures of the front face of the ophthalmic lens.

The management entity LMS may comprise a server comprising means to queue and run sequentially the received order requests.

Figure 2B:
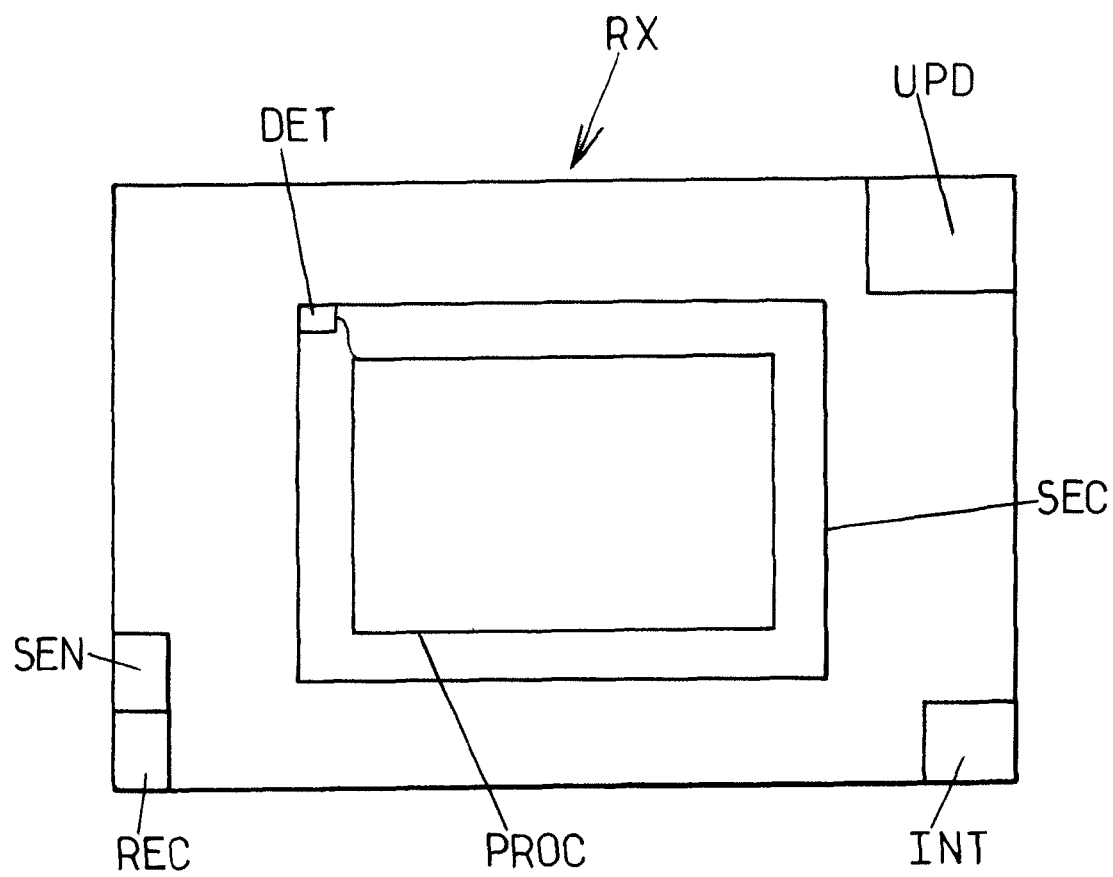
FIG. 2b is a schematic drawing illustrating a processing device according to an embodiment of the invention.

An example of a processing device RX according to the invention is illustrated on FIG. 2b.

The processing device according to the invention may comprise:
  receiving means REC arranged for receiving an order request from a management entity LMS, the management entity LMS being arranged to be linked to at least one lens manufacturing device MAN, the order request comprising at least information related to an optical wearer's prescription,
  processing means PROC arranged for processing the order request on the basis of predetermined processing rules so as to obtain parameters of the ophthalmic lens according to the information comprised in the order request,
  sending means SEN arranged for sending the obtained parameters of the ophthalmic lens to the management entity LMS.

The processing device RX is arranged to prevent an unauthorized access to the predetermined processing rules, for example the processing means PROC are arranged in a secured housing SEC.

The predetermined processing rules may comprise rules for selecting in a data base the most appropriate design for the ophthalmic lens. In addition or alternatively, the predetermined processing rules may comprise rules for calculating parameters of the ophthalmic lens so as to obtain the most appropriate design of the ophthalmic lens, for example the rules for calculating such parameter may be based on adapted formula.

The predetermined processing rules represent part of the know-how of the lens provider, which constitutes per se very sensitive data. Therefore, it is advantageous to arrange the processing device to prevent any access to the predetermined processing rules.

The processing means PROC may comprise a memory storing instructions for implementing at least part of the predetermined processing rules. The processing means may be arranged in a secured housing SEC. Advantageously, arranging the processing means, for example the memory of the processing means, in such a secured housing SEC allows preventing any unauthorized access to the processing means PROC.

The processing device RX, for example the secured housing SEC, may comprise detection means adapted to detect any unauthorized attempt to access to the processing means or to the memory comprised in the processing means. For example, the secured housing may comprise intrusion and/or opening detection means so as to detect an unauthorized attempt of intrusion and/or opening of the secured housing.

According to an embodiment of the invention the detection means DET may be arranged to, upon detection of an attempt to access to the processing means, erase the instructions for implementing at least part of the predetermined processing rules stored in the memory comprised in the processing means.

Alternatively and advantageously, the processing means may be arranged to be destroyed upon detection of an attempt to access to the processing mean. In the sense of the invention "destroy" shall mean physically destroy the processing means and/or the memory, for example mechanically and/or electrically. Thus, according to this last embodiment any attempt to restore the data and/or the predetermined processing rules comprised in the processing means and/or the memory remains unsuccessful.

The processing device RX may further comprise an interface INT arranged for receiving pluggable authorization means adapted to authorize access to the processing means, for example to the predetermined processing rules. The detection means may comprise access right management means so as to manage access rights to the processing means.

Indeed, the processing means, in particular the predetermined processing rules may need to be updated and/or maintained, therefore an access to the processing means, in particular to the predetermined processing rules, may be required.

The access right management means may comprise for example a distance right management system where the access rights are defined from a distant server to which the access right management means are connected. Such access right may be associated with a dongle, for example a SIM card and/or a RFID card and/or more generally any portable storage and processing means known by the person skilled in the art.

The dongle may be an electronic access key to the processing means. For example, the user connects the dongle to the back of the processing device RX so as to obtain the unlock of keyboard/mouse ports and/or disable the detection means in order to intervention on the processing means, for example to update the predetermined processing rules.

At first, the dongle may be programmed on a specific device so as to attribute a specific identifier of the target processing means, for example a MAC address. The management software platform may also retrieve the history of all processing means accessed with the dongle.

The user, for example a maintenance technician, who needs to access to the processing means of a processing device according to the invention may use the dongle for example by plugging the dongle into the interface INT arranged in the processing device. The communication exchange protocol between the dongle and the access right management means may be based on public/private key encryption and may comprise the following steps:
the dongle sends a random public encryption key to the access right management means,
the dongle and the access right management means both have the same private key,
a general key encryption is generated by the access right management means and the dongle based on the private and public keys,
the communication between the access right management means and the dongle is encrypted thanks to the common knowledge of the general key encryption,
the access right management means send an identifier to the dongle, for example the MAC address of the processing device,
the history of connection requests may be updated in the dongle,
the dongle compares the access right management means identifier, for example the MAC address of the processing device, received with the list of identifier, for example MAC addresses, of each processing means whose access is authorised with the dongle,
if the access right management means identifier, for example the processing device MAC address, is recognized by the dongle, then the user may access to the processing means for example by unlocking a keyboard/mouse ports and/or disabling the detection means of the processing device.

For example, an authorized person for the maintenance of the processing means may be given a number of access rights to the processing means via a distant server and when such person identifies himself using for example the dongle, the detection means shall consider the access attempt of such person as an authorized access attempt and therefore not disable nor destroy the processing means.

The processing device RX according to the invention may also comprise updated means UPD arranged to be linked via a secured connection NET4 to a distant entity SER and for sending an updated request to the distant entity SER so as to update the processing means, in particular the predetermined processing rules.

The secured network connection NET4 may be an internet connection using an encrypted secured connection, for example using an RSA algorithm.

The update request may comprise an identifier identifying the current version of the processing means PROC and/or of the predetermined processing rules.

Figure 3A:
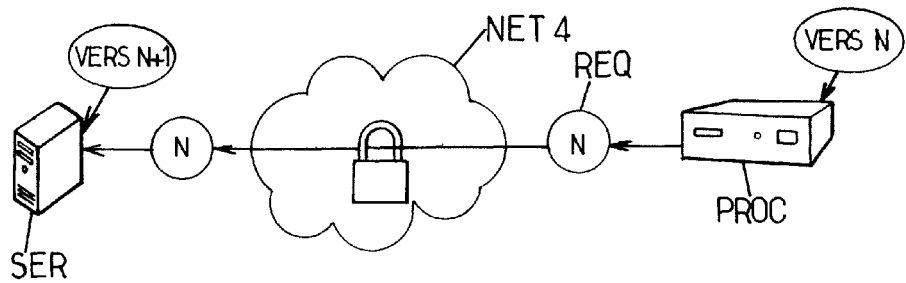
FIGS. 3a to 3c are schematic drawings of different states of the update of processing means according to an embodiment of the invention.
Figure 3B:
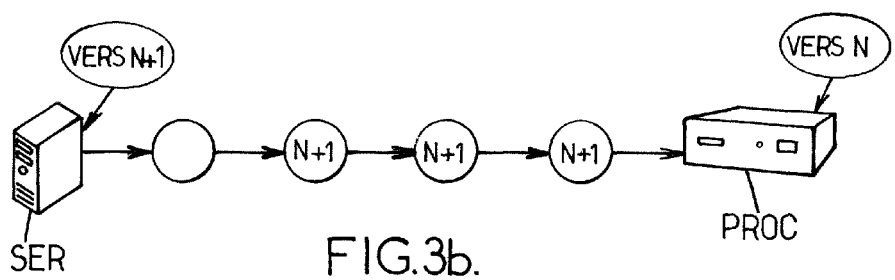

As shown on FIG. 3b, upon reception of the update request the distant server SER compares the current version of the processing means and/or predetermined processing rules with the most recent version. If the distant server SER finds that a more recent version of the processing means PROC and/or the predetermined processing rules, for example of the software program of the processing means and/or the data, exists, the most recent version of the processing means and/or predetermined processing rules is sent from the distant server SER to the processing means.

Figure 3C:
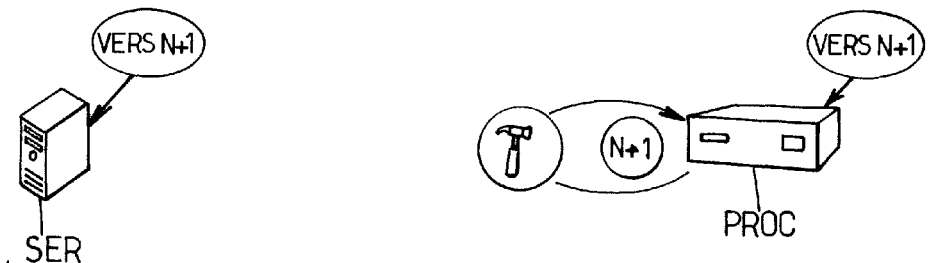

As shown on FIG. 3c the processing means may then install the most recent version and make sure that the installation is done correctly or rollback to the previous version if necessary.

According to an embodiment of the invention the processing system may comprise a plurality of processing devices. For example a processing system according to the invention may comprise first and second processing devices, each processing devices comprising processing means arranged for processing an order request on the base of predetermined processing rules so as to obtain parameters of an ophthalmic lens according to the information comprised in the order request.

The processing means of each processing devices may be arranged in distinct secured housings.

Each processing device may comprise a memory storing instructions for implementing at least part of the predetermined processing rules, and distinct detection means arranged for detecting any unauthorized attempt to access to the memory of said processing device and/or for, upon detection of an attempt to access to said memory, destroy the memory.

According to an embodiment of the invention, the processing means comprised in the first and second processing devices have the same predetermined processing rules and/or ophthalmic lens design data and/or calculating means adapted to calculate the manufacturing parameters of an ophthalmic lens according to the information comprised in the order request.

Advantageously, the use of a plurality of independent processing device may allow managing work load and failovers. The plurality of processing devices having the same predetermined processing rules may be arranged within a group.

One of the processing devices within a group is called the master processing device MAS and the other processing devices SLA are referred to as slave.

Advantageously, within a group the processing means of the processing devices have the same version of predetermined processing rules so as to minimize errors.

Associated with a group of processing device a processing system according to the invention may comprise a prototype processing device PROT having the same features as the processing devices according to the invention, but the processing means may be arranged to obtain specific parameters of an ophthalmic lens, for example test version of the processing means, in particular test version of the predetermined processing rules.

According to an embodiment of the invention the processing system may comprise a plurality of groups of processing devices.

Figure 4A:
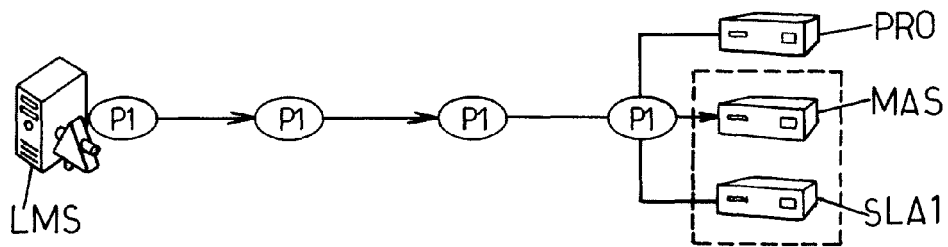
FIGS. 4a to 4d are schematic drawings illustrating a processing system according to the invention comprising a plurality of processing devices.

As shown on FIG. 4a the order request may be sent from the management entity LMS to the master processing device MAS.

Figure 4B:
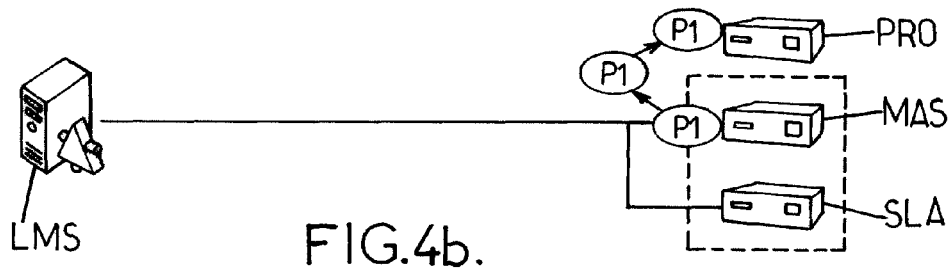

As shown on FIG. 4b when the master processing device MAS receives the order request, the master processing device MAS selects which processing device should processes the order request and sends the order request to the selected processing device.

Figure 4C:
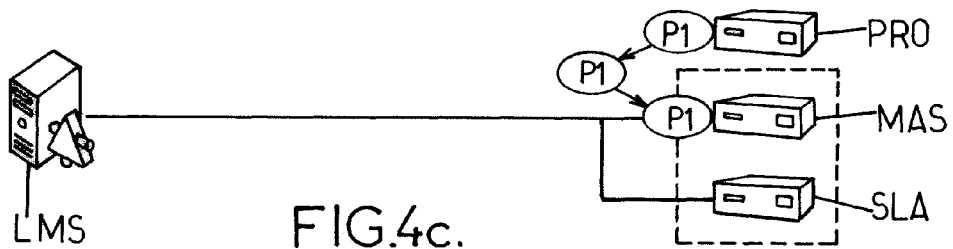

As shown on FIG. 4c when the selected processing device has processed the order request and obtain parameters of the ophthalmic lens, for example manufacturing parameters, the manufacturing parameters of the ophthalmic lens are sent to the master processing device MAS.

Figure 4D:
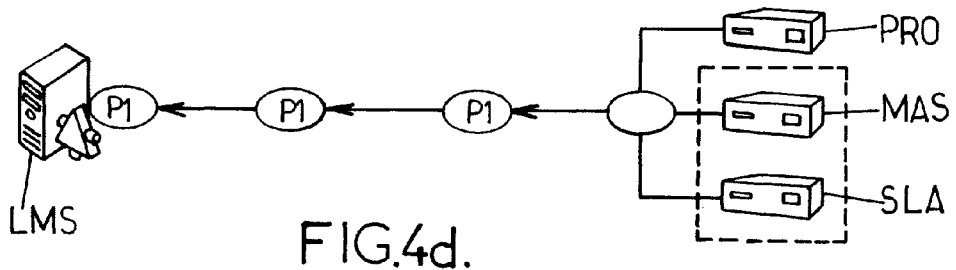

As shown on FIG. 4d the master processing device MAS sends to the management entity LMS the manufacturing parameters.

The managing entity LMS may then send the manufacturing parameters to the lens manufacturing device so as to manufacture the ophthalmic lens corresponding to the order request.

The use of a plurality of processing devices may allow managing failover of a processing device. An example of such management is illustrated on FIGS. 5a to 5c.

Figure 5A:
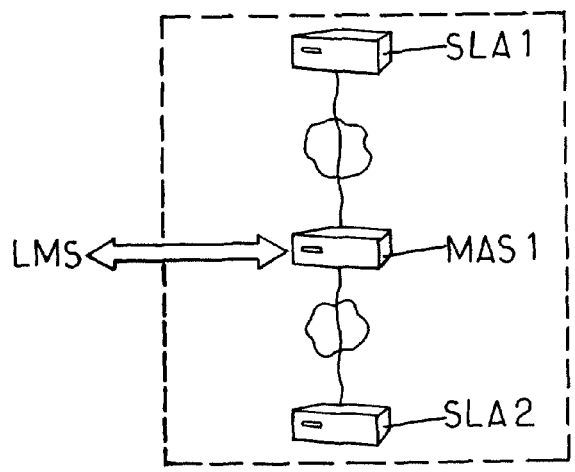
FIGS. 5a to 5c are schematic drawings illustrating a failover management process of a processing system according to the invention.

Represented on FIG. 5a is a normal processing mode in which each of the slave processing device SLA1, SLA2 are regularly updated with the master processing device data and the master processing device MAS1 availability is checked, that is that the master processing device can communicate normally with the management entity LMS.

Figure 5B:
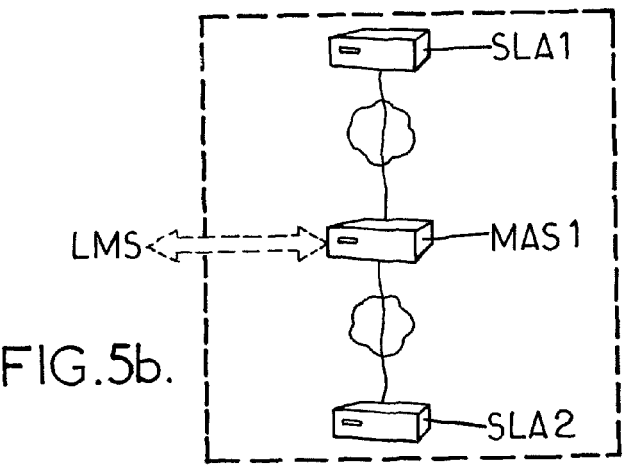

FIG. 5b represents a state where the master processing device MAS1 does not respond anymore. The slave processing devices SLA1, SLA2 continue to check the master processing device MAS1 availability and receive an error as result indicating that no communication is possible between the master processing device and the management entity LMS.

Figure 5C:
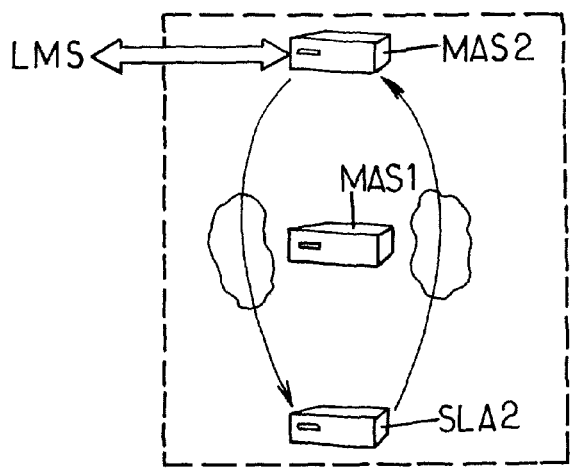

FIG. 5c represents a state in which one of the slave processing device SLA1 is automatically redefined as the new master processing device MAS2. The other slave processing device SLA2 can check the new master processing device MAS2 availability without error. The management entity LMS can communicate normally with the new master processing device MAS2.

Advantageously, the failover of the master processing device MAS can be managed and without requiring the stop of the processing method.

The invention has been described above with the aid of embodiments without limiting the general inventive concept of the invention.

The invention claimed is:

1. A method of processing an order request of an ophthalmic lens comprising:
   an order request receiving step in which an order request comprising at least information related to an optical wearer's prescription is received by a management entity;
   an order request transfer step in which the order request is transferred from the management entity to a processing device, the processing device comprising processing means arranged for processing the order request on the basis of predetermined processing rules comprising calculating rules adapted to calculate parameters of the ophthalmic lens according to the information comprised in the order request, the processing device being arranged to prevent an unauthorized access to the predetermined processing rules;
   an order request processing step in which the order request is processed by the processing means of the processing device on the basis of the predetermined processing rules so as to obtain parameters of the ophthalmic lens according to the information comprised in the order request, the parameters of the ophthalmic lens comprising manufacturing parameters, the manufacturing parameters comprising settings parameters of different manufacturing devices;
   a parameters transfer step in which the manufacturing parameters of the ophthalmic lens are transferred from the processing device to at least one lens manufacturing device; and
   a manufacturing step in which the ophthalmic lens is manufactured by the lens manufacturing device according to the manufacturing parameters determined by the processing means of the processing device.

2. A processing device for processing an order request of an ophthalmic lens, comprising:
   receiving means arranged for receiving an order request from a management entity, the management entity being arranged to manage at least one lens manufacturing device, the order request comprising at least information related to an optical wearer's prescription;
   processing means arranged for processing the order request on the basis of predetermined processing rules comprising calculating rules adapted to calculate parameters of the ophthalmic lens according to the information comprised in the order request, the parameters of the ophthalmic lens comprising manufacturing parameters, the manufacturing parameters comprising settings parameters of different manufacturing devices;
   sending means arranged for sending the parameters of the ophthalmic lens to the management entity,
   wherein the processing device is arranged to prevent an unauthorized access to the predetermined processing rules.

3. The processing device according to claim 2, wherein the predetermined processing rules comprise calculating rules adapted to calculate parameters of the ophthalmic lens from part of the information comprised in the order request.

4. The processing device according to claim 2, wherein the predetermined processing rules comprise rules for selecting in a data base the most appropriate design for the ophthalmic lens.

5. The processing device according to claim 2, wherein the processing means are arranged in at least one secured housing.

6. The processing device according to claim 2, wherein the processing means comprise a memory storing instructions for implementing at least part of the predetermined processing rules, and wherein the processing device further comprises detection means arranged for detecting an unauthorized attempt to access to the memory and/or for, upon detection of an unauthorized attempt to access to the memory, destroy the content of the memory.

7. The processing device according to claim 2, wherein the processing device further comprises an interface arranged for receiving pluggable authorization means adapted to authorize access to the predetermined processing rules.

8. The processing device according to claim 2, wherein the processing device comprises update means arranged to be linked via a secured connection to a distant entity and for sending an updated request to the distant entity so as to update the predetermined processing rules.

9. A server arranged for communicating via a secured connection with at least one processing device according to claim 8, the server comprising management update means arranged for, upon reception of an update request from the processing device, checking the current version of the predetermined processing rules of the processing device and sending update version of the predetermined processing rules to the processing device.

10. A processing system for processing an order request of an ophthalmic lens, comprising:
    a management entity arranged for receiving an order request, and for being linked to at least one lens manufacturing device;
    at least one processing device according to claim 3 linked to the management entity, wherein the management entity is linked to the processing device; and
    at least one lens manufacturing device linked to the management entity.

11. The processing system according to claim 10, wherein the processing system comprises a plurality of processing devices, the processing means of each processing devices being arranged in distinct secured housings.

12. The processing system according to claim 10, wherein the processing system comprises a plurality of processing devices, each processing device comprises a memory storing instructions for implementing at least part of the predetermined processing rules, and wherein each processing device further comprises distinct detection means arranged for detecting an unauthorized attempt to access to the memory of the processing device and/or for, upon detection of an unauthorized attempt to access to the memory, destroy the content of the memory.

13. The processing system according to claim 10, wherein the management entity is linked to the processing device via a secured connection.

\* \* \* \* \*